3,325,362
ISOGRISEOFULVIN PROVIDING HIGHER
GRISEOFULVIN BLOOD LEVELS
John William Poole, Norristown, Pa., assignor to McNeil Laboratories, Incorporated, a corporation of Pennsylvania
No Drawing. Filed Mar. 31, 1964, Ser. No. 356,044
13 Claims. (Cl. 167—65)

The present invention relates to a novel pharmaceutical composition of matter and to its preparation; and, more particularly, the invention relates to a novel griseofulvin-containing composition capable of providing higher griseofulvin blood levels than prior griseofulvin products and, hence, capable of improved utility in the treatment of skin disorders in mammals caused by fungus and parasites.

Griseofulvin, which is derived from Penicillium griseofulvin, is a well known antibiotic of interest primarily because, upon oral administration, it is transported to the skin where it exerts antifungal activity. Hence, it is used in the treatment of such disorders as athlete's foot, ringworm of the scalp, fungal infection of the nails, and the like. According to U.S. Patent No. 3,029,185, giseofulvin is also effective, upon oral administration, against mange in humans and lower animals, both wild and domestic, like dogs, horses, goats, cattle, sheep, swine, cats, rabbits, mink and foxes.

There is a direct correlation between the blood level of griseofulvin and its effectiveness in that the higher the blood level the greater the effectiveness. For example, the recommended dosage for the pharmaceutical grade of griseofulvin is 500 mg. four times a day, whereas the recommended dosage for the microcrystalline form—which provides blood levels about twice that of the pharmaceutical grade on an equal weight basis—is about half that.

It is the principal object of the present invention to provide a novel griseofulvin-containing composition capable of providing—on a weight for weight basis—higher griseofulvin blood levels than prior griseofulvin products.

Another object of the invention is to provide an improved orally active agent for the treatment of skin disorders caused by fungus and parasites.

A further object of the present invention is to provide novel pharmaceutical preparations in oral dosage form containing the novel composition.

Other objects, including the provision of methods of making the novel griseofulvin-containing product, will become apparent from a consideration of the following specification and the claims.

The novel product of the present invention consists essentially of an intimate mixture of griseofulvin and isogriseofulvin, the isogriseofulvin being present in a proportion from about 20% to about 90%, by weight, based on the combined weight of the two compounds. As will appear more in detail hereinafter, the stated product may be in the form of a simple dry physical admixture of the compounds, or it may be a co-fused or co-precipitated mixture of the compounds.

The stated composition, surprisingly, has been found to produce—on the basis of equal weights of total material—much higher blood levels of griseofulvin than does griseofulvin alone. Since the present composition is only partly griseofulvin, this means that a lesser amount of griseofulvin (in the present product) produces much higher griseofulvin blood levels than a given weight of griseofulvin unassociated with isogriseofulvin. For example, a given disage of a co-fused 50:50 mixture of griseofulvin and isogriseofulvin has been found to produce griseofulvin blood levels on the order of six times higher than the same dose of griseofulvin itself. I am presently unable to explain the reason for this. It is possible that a loose complex between the two compounds may occur in the co-fused and co-precipitated forms of the product, but this does not explain the improvement afforded by a simple physical admixture. Isogriseofulvin, on the other hand, has no previous utility as far as is known, and by itself produces insignificant griseofulvin blood levels compared to the present composition.

Griseofulvin is available in various grades, including a pharmaceutical grade and a microcrystalline grade, the latter having a smaller particle size. Either grade may be used in preparing the product of the present invention, particularly in producing the co-fused and co-precipitated form. In preparing the product by simple dry physical admixing, the microcrystalline grade is preferred. Isogriseofulvin, since it does not appear in the fermentation liquid with the griseofulvin during preparation of the latter, must be prepared by isomerization of griseofulvin. This may be accomplished with an acid under anhydrous conditions in accordance with known practice. As will appear hereinafter, one preferred way of preparing the present product is to convert to isogriseofulvin a controlled proportion only of a quantity of griseofulvin.

Referring to the preparation of the present product, it involves essentially mixing the two compounds in the desired ratio. One method is simply to admix the two compounds in dry, finely-divided form. Preferably this is done as part of a grinding operation comparable to the action of a mortar and pestle.

Another method involves co-fusion of the two compounds, cooling the resulting clear melt and grinding the glassy amorphous product. Co-fusion itself requires heating the mixed compounds to form a melt thereof. Griseofulvin melts at about 220° C. and isogriseofulvin melts at about 200° C. While a wide temperature range is useable—from a eutectic point of about 178° C. to below the decomposition point, a convenient temperature is in the neighborhood of 210–230° C. It may also be advisable, in view of the elevated temperatures, to use an inert gas atmosphere, like nitrogen, to avoid any slight discoloration due to oxidation.

A third method broadly involves co-precipitation of the mixed compounds, and this may be further sub-divided into two embodiments. In one embodiment, the two compounds are simply dissolved in a mutual solvent and the product precipitated as by complete evaporation of the solvent or, where the solvent is water-miscible, by dilution with a non-solvent, such as water, with or without previous partial evaporation of the solvent. Suitable solvents in this connection are methanol, ethanol, acetone, benzene, chloroform, ethyl acetate and the like. In the other embodiment, griseofulvin is dissovled in a solvent, such as one of those mentioned above, and a portion of it is then converted to isogriseofulvin. The resulting mixture of griseofulvin and isogriseofulvin is then precipitated as described above. This partial conversion involves contacting the griseofulvin with an acid under anhydrous conditions, under conditions providing conversion (isomerization) of only a portion of the griseofulvin to isogriseofulvin. Examples of suitable acids (anhydrous) are HCl; sulfonic acids, like methane sufonic acid; fumaric acid; hexamic acid; sulfamic acids, and the like. A water-soluble acid is preferred so that it can be removed from the product by washing. In this connection, washing with an aqueous solution of a weak base is desirable to aid in the removal of the acid as well as to insure removal of possible breakdown products, like griseofulvic acid. Complete conversion of griseofulvin to isogriseofulvin by this anhydrous acid method is known as a means of producing isogriseofulvin. The present embodiment, as noted above however, requires partial conversion only of the griseofulvin, that is conversion of only that portion of the griseofulvin to result in a mixture of griseofulvin and isogriseofulvin having the desired ratio within the range set forth herein. The concentration of acid and the time and temperature employed will depend not only upon the particular acid selected but also upon the degree of conversion desired. The conditions for any particular acid and degree of conversion can easily be determined by analyzing samples of the reaction mixture, taken from time to time, for griseofulvin and isogriseofulvin contents. A convenient means of assaying a mixture of these two compounds is set forth hereinafter in Example XIV, Depending upon the factors set forth above the temperature may range from room temperature to reflux and the time may range from minutes to several hours.

The co-fused product and the co-precipitated product, particularly the co-precipitated product wherein the isogriseofulvin content is derived by the in situ isomerization of griseofulvin in the presence of the griseofulvin content as described in the preceding paragraph, provide the greatest increases in griseofulvin blood levels, and, hence, represent the preferred forms of the present invention.

Referring further to the relative proportions of isogriseofulvin to griseofulvin in the present composition, it has been found that the increase in griseofulvin blood level increases significantly at isogriseofulvin contents of about 20% by weight, and above, based on the combined weight of the isogriseofulvin and the griseofulvin. No advantage is to be gained at isogriseofulvin concentrations above about 90%. Generally speaking, an isogriseofulvin content in the lower intermediate range, especially from about 25 to about 50%, is preferred.

The present product, as stated, is primarily useful for oral administration to mammals in the treatment of fungal skin disorders and mange. Hence, the product may be made up into the usual oral dosage unit forms, such as tablets, capsules, microencapsulations, powders, suspensions, and the like. Thus, in accordance with conventional pharmaceutical practice, the present composition may be combined with an orally ingestible pharmaceutically acceptable carrier, such as gelatin, in the case of capsules; various combinations of water, glycols, oils, and the like, in the case of suspensions; starches, sugars, kaolin, microcrystalline cellulose, salts, lubricants, binders and the like, in various combinations, in the case of powders and tablets. Non-liquid dosage forms are preferred, especially capsules and tablets.

In such dosage compositions, the present product will generally be present in an amount from about 25 milligrams to about 250 milligrams per dosage unit.

The present invention will be more readily understood from a consideration of the following specific examples which are given for the purpose of illustration only and are not intended to limit the scope of the invention in any way.

*Examples I–II*

Various proportions of griseofulvin (microcrystalline) and isogriseofulvin, set forth below, are mixed and ground together in a mortar and pestle for 10 minutes:

| Example | Griseofulvin (grams) | Isogriseofulvin (grams) |
|---|---|---|
| I | 5 | 5 |
| II | 1 | 9 |

*Examples III–IX*

Various proportions of griseofulvin and isogriseofulvin, set forth below, are dissolved at room temperature in methanol using 200 ml. methanol for each gram of griseofulvin. The solutions are allowed to stand at room temperature until the methanol has evaporated, and the precipitated residue is broken up:

| Example | Griseofulvin (grams) | Isogriseofulvin (grams) |
|---|---|---|
| III | 8 | 2 |
| IV | 7.5 | 2.5 |
| V | 6 | 4 |
| VI | 5 | 5 |
| VII | 3 | 7 |
| VIII | 2.5 | 7.5 |
| IX | 1 | 9 |

*Examples X–XIII*

Various proportions of griseofulvin and isogriseofulvin, set forth below, are mixed and heated in an oil bath to 230° C. to form a clear homogeneous melt. The melt is then cooled gradually to room temperature and the resulting glassy, essentially amorphous product is ground.

| Example | Griseofulvin (grams) | Isogriseofulvin (grams) |
|---|---|---|
| X | 7.5 | 2.5 |
| XI | 5 | 6 |
| XII | 2.5 | 7.5 |
| XIII | 1 | 9 |

*Example XIV*

Six grams of griseofulvin and 9 grams of fumaric acid are dissolved in 300 ml. anhydrous methanol, and the solution is refluxed for 16 hours. The resulting solution is diluted to 3 liters with distilled water. The resulting precipitate is recovered by filtration and washed with a saturated solution of sodium bicarbonate in distilled water and finally with water. Drying the material under vacuum at about 60° C., provides 4.5 g. of product (75% yield).

The product is assayed for griseofulvin and isogriseofulvin as follows: the ultraviolet absorption of one milligram of the product in 100 ml. of 1% methanol in water (a 1 mg. percent solution of the solid) is measured at about 295μ. Five ml. of a 4 mg. percent solution of the product in a 4% solution of methanol in water are then mixed with 1 ml. of a 5% aqueous NaOH solution to selectively hydrolyze the isogriseofulvin, the mixture being allowed to stand for 8 minutes. Following extraction of the material with 10 ml. of chloroform, the U.V. absorption of the chloroform solution is measured at about 295μ to determine the griseofulvin content. The isogriseofulvin content is determined by difference in absorbance readings from appropriate standards. The proportions found are: griseofulvin, 69.8% ±5%; isogriseofulvin, 25.1% ±5%.

*Example XV*

A solution of 76 g. of griseofulvin and 114 g. of fumaric acid in 3.8 l. of anhydrous methanol is refluxed for 17 hours. Methanol is then removed by distillation to a final volume of about 1 l. which is then diluted to 10 l. with distilled water. The resulting precipitate is recovered by filtration and washed as in Example XIV. Drying the material at room temperature for 72 hours provides 71 g. of product (93.4% yield).

Assaying as in Example XIV shows 58% ±5% of griseofulvin and 38.2% ±5% isogriseofulvin.

The products of the foregoing examples are tested and compared with griseofulvin and isogriseofulvin separately as follows: Each product and control are administered orally to several male rats at the rate of 50 mg./kg. of body weight as a suspension (5 mg./ml.) in a 0.05% aqueous solution of polyoxyethylene sorbitan monoleate. With controls A and B and the products of Examples I, II, IV, VI and VIII–XIII, each test species (three in each set) is sacrificed three hours after administration and the blood (plasma) of each individual is separately assayed for griseofulvin. The blood level figures given in the following table for these products and controls represent the average three separate measurements (except for Control B and Example XIII where one sample of each was lost and the figures are the average of two measurements). With the remaining controls and examples, the blood of a sufficient number of test species in each set (3–5) to provide 10 ml. of blood (upon sacrifice three hours after administration except for Example XIV) is pooled and one measurement made thereon. All measurements are made by analyzing the plasma spectrofluorometrically to measure the total fluorescence of each sample before and after hydrolysis of isogriseofulvin.

The results are as follows:

| Example | Composition of Material Administered | | Griseofulvin Blood Level [1] (Microgram/ml.) |
|---|---|---|---|
| | Percent Griseofulvin | Percent Isogriseofulvin | |
| Control A | [2] 100 | 0 | 0.5 |
| Control B | 0 | 100 | 0.3 |
| Control C | [3] 100 | 0 | 0.2 |
| Control D | [2] 100 | 0 | 0.7 |
| I | 50 | 50 | 1.3 |
| II | 10 | 90 | 2.5 |
| III | 80 | 20 | 1.1 |
| IV | 75 | 25 | 1.0 |
| V | 60 | 40 | 2.2 |
| VI | 50 | 50 | 1.7 |
| VII | 30 | 70 | 2.7 |
| VIII | 25 | 75 | 0.7 |
| IX | 10 | 90 | 1.5 |
| X | 75 | 25 | 3.7 |
| XI | 50 | 50 | 3.3 |
| XII | 25 | 75 | 3.4 |
| XIII | 10 | 90 | 5.3 |
| XIV | 69.8±5 | 25.1±5 | [4] 3.9(4.1) |
| XV | 58±5 | 38.2±5 | 5.7 |

[1] Prior work with griseofulvin, pharmaceutical and microcrystalline grades, has shown a direct correlation between griseofulvin blood levels in rats and in humans.
[2] As microcrystalline.
[3] As pharm. grade.
[4] In this case no test was made at 3 hrs.; the first figure represents the blood (plasma) level at 2 hrs., and the second figure at 4 hrs.

*Example XVI*

Capsules, each containing 100 mg. of the present product may be made by filling hard shell gelatin capsules, each with a mixture of 100 mg. of the present product, such as the product of Example XI, and 100 mg. of lactose.

*Example XVII*

Tablets, each containing 200 mg. of the present product, may be made by tableting a mixture of 200 mg. of the present product, such as the product of Example XV, 200 mg. of microcrystalline cellulose and 2 mg. of calcium stearate.

Modification is possible in the techniques employed in preparing the product of the present invention as well as in preparing pharmaceutical preparations therefrom without departing from the scope of the present invention.

What is claimed is:

1. A composition consisting essentially of a co-fused mixture of griseofulvin, M.P. about 220° C., and isogriseofulvin, the isogriseofulvin M.P. about 200° C., being present in a proportion from about 20% to about 90%, by weight, based on the combined weight of the two compounds.

2. A composition consisting essentially of a co-precipitated mixture of griseofulvin, M.P. about 220° C., and isogriseofulvin, the isogriseofulvin, M.P. about 200° C., being present in a proportion from about 20% to about 90%, by weight, based on the combined weight of the two compounds.

3. The product of claim 2 wherein the isogriseofulvin content is derived by the in situ isomerization of griseofulvin in the presence of said griseofulvin content.

4. A pharmaceutical preparation in oral dosage unit form comprising an orally ingestible pharmaceutical carrier and an amount from about 25 to about 250 milligrams per dosage unit of a composition consisting essentially of an intimate mixture of griseofulvin, M.P. about 220° C., and isogriseofulvin, M.P. about 200° C., the isogriseofulvin being present in said composition in a proportion from about 20% to about 90% by weight, based on the combined weight of the two compounds.

5. The method of making an improved griseofulvin containing composition which comprises intimately mixing griseofulvin, M.P. about 220° C., and isogriseofulvin, M.P. about 200° C., in a proportion of isogriseofulvin of from about 20% to about 90%, by weight, based on the weight of the two compounds, wherein said intimate mixing comprises melting the two compounds together, cooling the melt to below its freezing point, and grinding the resulting solid product.

6. The method of making an improved griseofulvin containing composition which comprises intimately mixing griseofulvin, M.P. about 220° C., and isogriseofulvin, M.P. about 200° C., in a proportion of isogriseofulvin of from about 20% to about 90%, by weight, based on the weight of the two compounds, wherein said intimate mixing comprises co-precipitating the two compounds from a single solution thereof.

7. The method of claim 6 wherein said co-precipitation comprises evaporating away the solvent from said single solution of the two compounds.

8. The method of claim 7 wherein the isogriseofulvin content of said solution is derived by the in situ isomerization of griseofulvin in the presence of the griseofulvin content of said solution.

9. The method of claim 6 wherein said co-precipitation comprises diluting said single solution of the two compounds with a liquid non-solvent for the two compounds.

10. The method of claim 9 wherein the isogriseofulvin content of said solution is derived by the in situ isomerization of griseofulvin in the presence of the griseofulvin content of said solution.

11. The method of claim 6 wherein said co-precipitation comprises evaporating away a portion of the solvent from said single solution and diluting the remainder of the solution with a liquid non-solvent for the two compounds.

12. The method of increasing griseofulvin blood levels which comprises orally administering a composition consisting essentially of an intimate mixture of griseofulvin and isogriseofulvin, the isogriseofulvin being present in a proportion from about 20% to about 90%, by weight, based on the combined weight of the two compounds.

13. The method of increasing griseofulvin blood levels which comprises administering a pharmaceutical preparation in oral dosage unit form comprising an orally ingestible pharmaceutical carrier and an amount from about 25 to about 250 milligrams per dosage unit of a composition consisting essentially of an intimate mixture of griseofulvin, M.P. about 220° C., and isogriseofulvin, M.P. about 200° C., the isogriseofulvin being present in said composition in a proportion from about 20% to about 90% by weight, based on the combined weight of the two compounds.

References Cited

UNITED STATES PATENTS

| | | | |
|---|---|---|---|
| 3,090,791 | 5/1963 | Brossi et al. | 260—364.2 |
| 3,102,123 | 8/1963 | Clark et al. | 260—346.2 |
| 3,109,849 | 11/1963 | Walker et al. | 260—346.2 |
| 3,128,286 | 4/1964 | Walker et al. | 260—346.2 |

(Other references on following page)

OTHER REFERENCES

Brossi et al.: "Synthesis Experiments in the Griseofulvin Series, Total Synthesis of Griseofulvin," Helv. Chim. Acta 43: 1444–7 (1960).

Brossi et al.: "Griseofulvin, a Total Synthesis," Helv. Chim. Acta 43: 2071–2087 (1960).

Crosse et al.: "Relations Between Chemical Structure and Antifungal Effects of Griseofulvin Analogs," J. Gen. Microbiol. 34: 51–65 (Apr. 16, 1964).

Holbrook et al.: "Quantitative Chromatographic Method for the Determination of Purity of Griseofulvin," J. Pharm. Pharmacol. Suppl. 15: 270T–277T (December 1963).

LEWIS GOTTS, *Primary Examiner*.

ELBERT L. ROBERTS, *Examiner*.

S. K. ROSE, *Assistant Examiner*.